US011932057B2

(12) United States Patent
Yoshida

(10) Patent No.: US 11,932,057 B2
(45) Date of Patent: Mar. 19, 2024

(54) PNEUMATIC TIRE

(71) Applicant: The Yokohama Rubber Co., LTD., Tokyo (JP)

(72) Inventor: Hiroyuki Yoshida, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 16/634,538

(22) PCT Filed: Jul. 25, 2018

(86) PCT No.: PCT/JP2018/027875
§ 371 (c)(1),
(2) Date: Jan. 27, 2020

(87) PCT Pub. No.: WO2019/022129
PCT Pub. Date: Jan. 31, 2019

(65) Prior Publication Data
US 2021/0086563 A1 Mar. 25, 2021

(30) Foreign Application Priority Data

Jul. 27, 2017 (JP) .................................. 2017-145126

(51) Int. Cl.
*B60C 11/12* (2006.01)
*B60C 11/01* (2006.01)
(Continued)

(52) U.S. Cl.
CPC .......... *B60C 11/1307* (2013.01); *B60C 11/01* (2013.01); *B60C 11/11* (2013.01);
(Continued)

(58) Field of Classification Search
CPC ......... B60C 11/1307; B60C 2011/0381; B60C 2011/133; B60C 2011/0383; B60C 11/13;
(Continued)

(56) References Cited

U.S. PATENT DOCUMENTS 5,031,680 A     7/1991   Kajikawa et al.
6,408,911 B1 *   6/2002   Tanabe ................ B60C 11/1369
                                                                       152/902

(Continued)

FOREIGN PATENT DOCUMENTS

CN       102689568       9/2012
EP        1213160 A1 *   6/2002         B60C 11/1392

(Continued)

OTHER PUBLICATIONS

JP 2009006870 Machine Translation; Itakura, Keisuke (Year: 2009).*

(Continued)

*Primary Examiner* — Katelyn W Smith
*Assistant Examiner* — Nicholas J Weiler
(74) *Attorney, Agent, or Firm* — Thorpe North & Western

(57) ABSTRACT

Provided is a pneumatic tire. A tread portion includes a plurality of longitudinal grooves extending in the tire circumferential direction, a plurality of lateral grooves extending in a tire lateral direction, and a plurality of blocks defined by the longitudinal grooves and the lateral grooves. Notch portions are formed in portions of a freely-selected pair of blocks adjacent to each other across a longitudinal groove, the portions facing the longitudinal groove. The notch portions face with each other across the longitudinal groove. Each of the notch portions has a notch width and a notch depth larger on a center side in an extension direction of the longitudinal groove than on an outer side in the extension direction of the longitudinal groove.

9 Claims, 5 Drawing Sheets

(51) Int. Cl.
*B60C 11/11* (2006.01)
*B60C 11/13* (2006.01)

(52) U.S. Cl.
CPC ...... *B60C 11/1204* (2013.01); *B60C 11/1236* (2013.01); *B60C 11/1259* (2013.01); *B60C 11/1272* (2013.01); *B60C 2011/1213* (2013.01); *B60C 2011/133* (2013.01)

(58) Field of Classification Search
CPC . B60C 11/03; B60C 11/1376; B60C 11/1392; B60C 11/1384; B60C 11/1272; B60C 11/125; B60C 2011/1245; B60C 11/1236
See application file for complete search history.

(56) References Cited

U.S. PATENT DOCUMENTS

| | | | |
|---|---|---|---|
| 2004/0238092 | A1 | 12/2004 | Colombo et al. |
| 2012/0241061 | A1 | 9/2012 | Maehara |
| 2013/0206294 | A1 | 8/2013 | Akashi |
| 2013/0263988 | A1* | 10/2013 | Minoli ............... B60C 11/0316 152/209.19 |
| 2014/0041778 | A1 | 2/2014 | Rubber |
| 2017/0015143 | A1* | 1/2017 | Nagase ............... B60C 11/0304 |
| 2017/0066290 | A1* | 3/2017 | Fujioka ............... B60C 11/1218 |
| 2019/0118581 | A1* | 4/2019 | Suzuki ............... B60C 11/12 |

FOREIGN PATENT DOCUMENTS

| | | | | |
|---|---|---|---|---|
| JP | H02-053608 | | 2/1990 | |
| JP | H07-164827 | | 6/1995 | |
| JP | 2001-277815 | | 10/2001 | |
| JP | 2004-098943 | | 4/2004 | |
| JP | 2005-193702 | | 7/2005 | |
| JP | 2007-331656 | | 12/2007 | |
| JP | 2009-006870 | | 1/2009 | |
| JP | 2009-220779 | | 10/2009 | |
| JP | 2009-286276 | | 12/2009 | |
| JP | 2011-068316 | | 4/2011 | |
| JP | 2012-076597 | | 4/2012 | |
| JP | 2013-035346 | | 2/2013 | |
| JP | 2014-034334 | | 2/2014 | |
| JP | 2015134578 A | * | 7/2015 | ......... B60C 11/1376 |
| WO | WO 03/013881 | | 2/2003 | |
| WO | WO 2012/053559 | | 4/2012 | |

OTHER PUBLICATIONS

JP 2015134578 Machine Translation; Ichiyanagi, Yutaka (Year: 2015).*

International Search Report for International Application No. PCT/JP2018/027875 dated Oct. 30, 2018, 4 pages, Japan.

* cited by examiner

PNEUMATIC TIRE

TECHNICAL FIELD

The present technology relates to a pneumatic tire suitable as a tire used for driving on unpaved roads, and more specifically relates to a pneumatic tire providing enhanced driving performance on unpaved roads and enhanced wear resistance performance.

BACKGROUND ART

For pneumatic tires used for driving on unpaved roads such as uneven ground, muddy ground, snowy roads, sandy ground, and rocky areas, a tread pattern is generally employed that is based on lug grooves or blocks including many edge components and that has a large groove area. For such a tire, driving performance on unpaved roads is improved by biting into mud, snow, sand, stone, rock, or the like (hereinafter, referred to collectively as "mud or the like") on a road surface to achieve traction performance and preventing grooves from being blocked with mud or the like (for example, see Japan Unexamined Patent Publication No. 2009-220779).

However, in such a tire, the groove area is set to a large value in order to sufficiently bite into mud or the like, or a sipe is formed in each block in order to increase the number of edge components. Thus, there is a problem in that block rigidity is likely to decrease, leading to difficulty in providing both improved driving performance on unpaved roads (in particular, traction performance and starting performance) and ensured wear resistance of the blocks in a compatible manner to a high degree. Thus, there is a demand for measures for effectively biting into mud or the like via grooves to improve driving performance (mud performance) on unpaved roads (in particular, muddy roads), while ensuring sufficient wear resistance of the blocks, and providing such performances in a well-balanced, compatible manner.

SUMMARY

The present technology provides a pneumatic tire, which is suitable as a tire used for driving on unpaved roads and provides enhanced driving performance on unpaved roads and enhanced wear resistance performance.

A pneumatic tire according to the present technology includes a tread portion extending in a tire circumferential direction and having an annular shape, a pair of sidewall portions arranged on both sides of the tread portion, and a pair of bead portions arranged inward of the pair of sidewall portions in a tire radial direction, wherein the tread portion includes a plurality of longitudinal grooves extending in the tire circumferential direction, a plurality of lateral grooves extending in a tire lateral direction, and a plurality of blocks defined by the plurality of longitudinal grooves and the plurality of lateral grooves, notch portions are formed in portions of a freely-selected pair of blocks adjacent to each other across a longitudinal groove, the portions facing the longitudinal groove, the notch portions face with each other across the longitudinal groove, and the notch portion has a notch width and a notch depth larger on a center side in an extension direction of the longitudinal groove than on an outer side in the extension direction of the longitudinal groove.

In the present technology, for the tire, which includes the blocks as its basis and is provided to enhance driving performance on unpaved roads (for example, mud performance), the pair of notch portions facing with each other across the longitudinal groove are further formed in the pair of blocks adjacent to each other in the tire lateral direction, as described above. Thus, when the pair of blocks are deformed toward the longitudinal groove side while traveling, mud or the like in an area surrounded by the pair of notch portions is compressed, and a high shear force can be obtained. As a result, driving performance on unpaved roads (for example, mud performance) can be enhanced effectively. In this case, the notch width and the notch depth are larger on the center side in the extension direction of the longitudinal groove than on the outer side in the extension direction. Thus, even when the notch portion is provided, wear resistance can be maintained satisfactorily.

In the present technology, each of the plurality of blocks preferably has a sipe having a groove width of 1.5 mm or less extending in the tire lateral direction or a shallow groove having a groove depth of 2 mm or less, the shallow groove being provided with a sipe with a groove width of 1.5 mm or less in the groove, and only the sipe or only the sipe and the shallow groove preferably communicate with the notch portion. As described above, only the sipe or only the combination of the sipe and the shallow groove is caused to communicate with the notch portion. As a result, an edge effect due to the sipe or the shallow groove can be imparted, which is advantageous in enhancing driving performance on unpaved roads.

In the present technology, the notch width of the notch portion preferably falls within a range from 10% to 25% of a tire lateral direction length of the block. By setting the notch width as described above, the size of the notch portion is optimized, which is advantageous in achieving driving performance on unpaved roads (for example, mud performance) and wear resistance in a well-balanced, compatible manner.

In the present technology, a portion of the notch portion, which has the largest notch depth, is preferably positioned at 35% or greater of a maximum groove depth of the longitudinal groove from the groove bottom of the longitudinal groove. With this, the notch depth can be optimized, which is advantageous in achieving driving performance on unpaved roads (for example, mud performance) and wear resistance in a well-balanced, compatible manner.

In the present technology, a ratio of an area of the notch portion on the road contact surface of the block with respect to a projected area of the road contact surface of the block preferably falls within a range from 3% to 16%. By setting the area of the notch portion as described above, the size of the notch portion is optimized, which is advantageous in achieving driving performance on unpaved roads (for example, mud performance) and wear resistance in a well-balanced, compatible manner.

In the present technology, the notch length of the notch portion preferably falls within a range from 40% to 75% of a tire circumferential direction length of the block provided with the notch portion. By setting the notch length as described above, the size of the notch portion is optimized, which is advantageous in achieving driving performance on unpaved roads (for example, mud performance) and wear resistance in a well-balanced, compatible manner.

In the present technology, the notch portion preferably has a bottom portion formed of a surface parallel with the road contact surface of the block. By providing the bottom portion as described above, the notch portion can compress mud or the like efficiently, and a shear force can further be enhanced. This is advantageous in enhancing driving performance on unpaved roads (for example, mud performance).

In the present technology, the dimensions are dimensions on the tread contact surface unless otherwise noted. "Road contact surface" of each block is a surface portion of each block actually contacting a plane on which the tire is placed vertically when a regular load is applied under a state in which a tire is mounted on a regular rim and inflated to a regular internal pressure, and does not include, for example, a chamfered portion that does not actually contact the plane. Additionally, "ground contact edge" refers to both ends in the tire axial direction in this state. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire and Rim Association, Inc.), and refers to a "measuring rim" in the case of ETRTO (European Tire and Rim Technical Organization). "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle. "Regular load" is a load defined by standards for each tire according to a system of standards that includes standards on which tires are based, and refers to "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO. "Regular load" corresponds to 88% of the loads described above for a tire on a passenger vehicle.

DETAILED DESCRIPTION

Configurations of embodiments of the present technology will be described in detail below with reference to the accompanying drawings.

Figure 1:
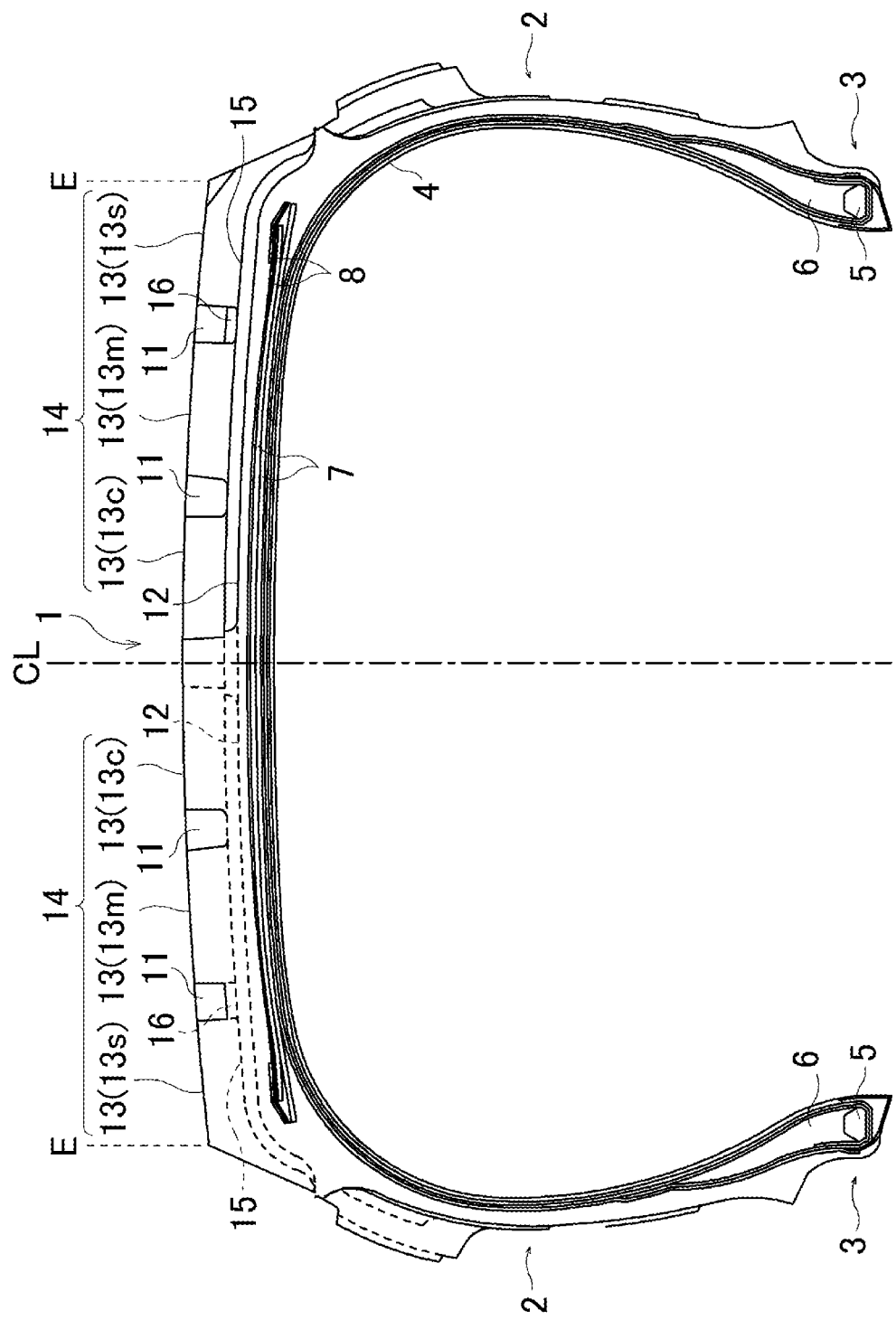
FIG. 1 is a meridian cross-sectional view of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 arranged on both sides of the tread portion 1, and a pair of bead portions 3 arranged inward of the sidewall portions 2 in the tire radial direction. Note that, in FIG. 1, reference sign "CL" denotes a tire equator, and reference sign "E" denotes a ground contact edge.

A carcass layer 4 is mounted between the left-right pair of bead portions 3. The carcass layer 4 includes a plurality of reinforcing cords extending in the tire radial direction, and is folded back around a bead core 5 arranged in each of the bead portions 3 from a vehicle inner side to a vehicle outer side. Additionally, bead fillers 6 are arranged on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a general pneumatic tire, however, the cross-sectional structure thereof is not limited to the basic structure described above.

Figure 2:
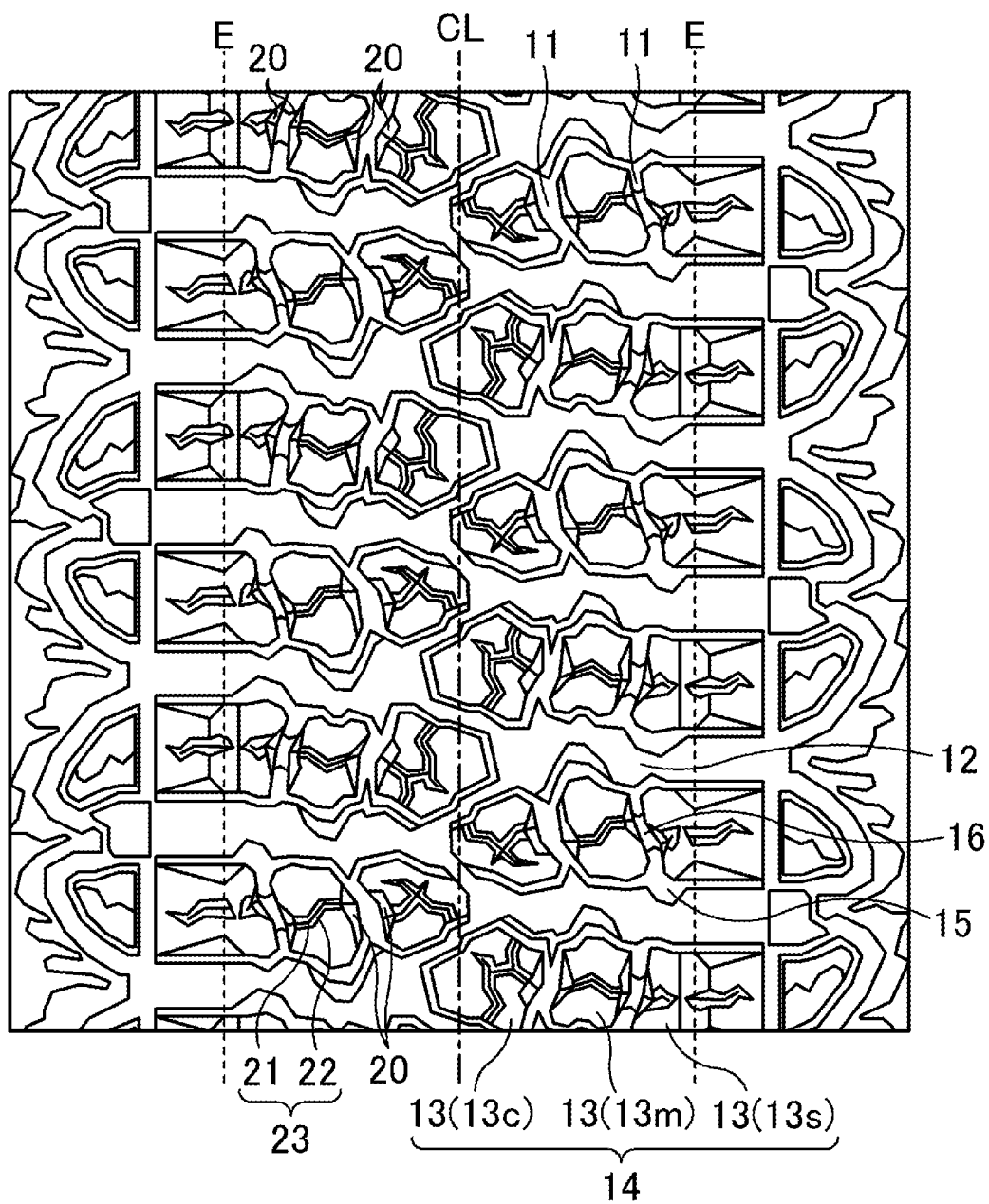
FIG. 2 is a front view illustrating a tread surface of a pneumatic tire according to an embodiment of the present technology.

As illustrated in FIG. 2, on an outer surface of the tread portion 1 of the pneumatic tire according to the present technology, a plurality of longitudinal grooves 11 extending in the tire circumferential direction, a plurality of lateral grooves 12 extending in a tire lateral direction, and a plurality of blocks 13 defined by the longitudinal grooves 11 and the lateral grooves 12. Particularly, in the present technology, the plurality of blocks include shoulder blocks 13s positioned on outermost sides in the tire lateral direction, center blocks 13c positioned on sides closest to a tire equator CL, and middle blocks 13m positioned between the shoulder blocks 13s and the center blocks 13c. The blocks 13 (shoulder blocks 13s, center blocks 13c, and middle blocks 13m) are arranged to be arrayed along the tire lateral direction with respect to the shoulder blocks 13s, and form block groups 14. Further, the block groups 14 each formed of the blocks 13 are arrayed repeatedly in the tire circumferential direction across the lateral grooves 12.

In the illustrated example, the block group 14 formed of the blocks 13 is present on a table-like platform 15, which is raised from a groove bottom of the lateral groove 12 and has a flat top surface. On the top surface, the blocks 13 and the longitudinal grooves 11 can be arranged. In this case, the longitudinal grooves 11 positioned between the blocks 13 forming each of the block groups 14 are also present on the platform 15. The groove bottoms of the longitudinal grooves 11 are flush with the top surface of the platform 15, or are positioned on the block road contact surface side with respect to the top surface of the platform 15. Each of the platforms 15 has a shape protruding toward both sides in the tire circumferential direction with respect to at least three blocks 13 forming each of the platforms 15, as viewed from the block road contact surface side. A contour line of each of the platforms 15 is bent along contour lines of at least three blocks 13 forming each of the platforms 15.

In addition, in the illustrated example, on a groove bottom of the longitudinal groove 11 adjacent to the shoulder block 13s, a raised bottom portion 16 raised from the groove bottom of the longitudinal groove 11 is provided. Further, the raised bottom portion 16 connects the shoulder block 13s and the middle block 13m.

The present technology relates to a notch portion 20 described later, which is provided to each of the blocks 13. Thus, as long as the blocks 13 adjacent to each other across the longitudinal grooves 11 are present, the shape of the entire tread pattern is not limited to the illustrated mode. Note that the tread pattern in FIG. 2 exerts excellent driving performance on unpaved roads in collaboration with the notch portion 20 described later.

Figure 3:
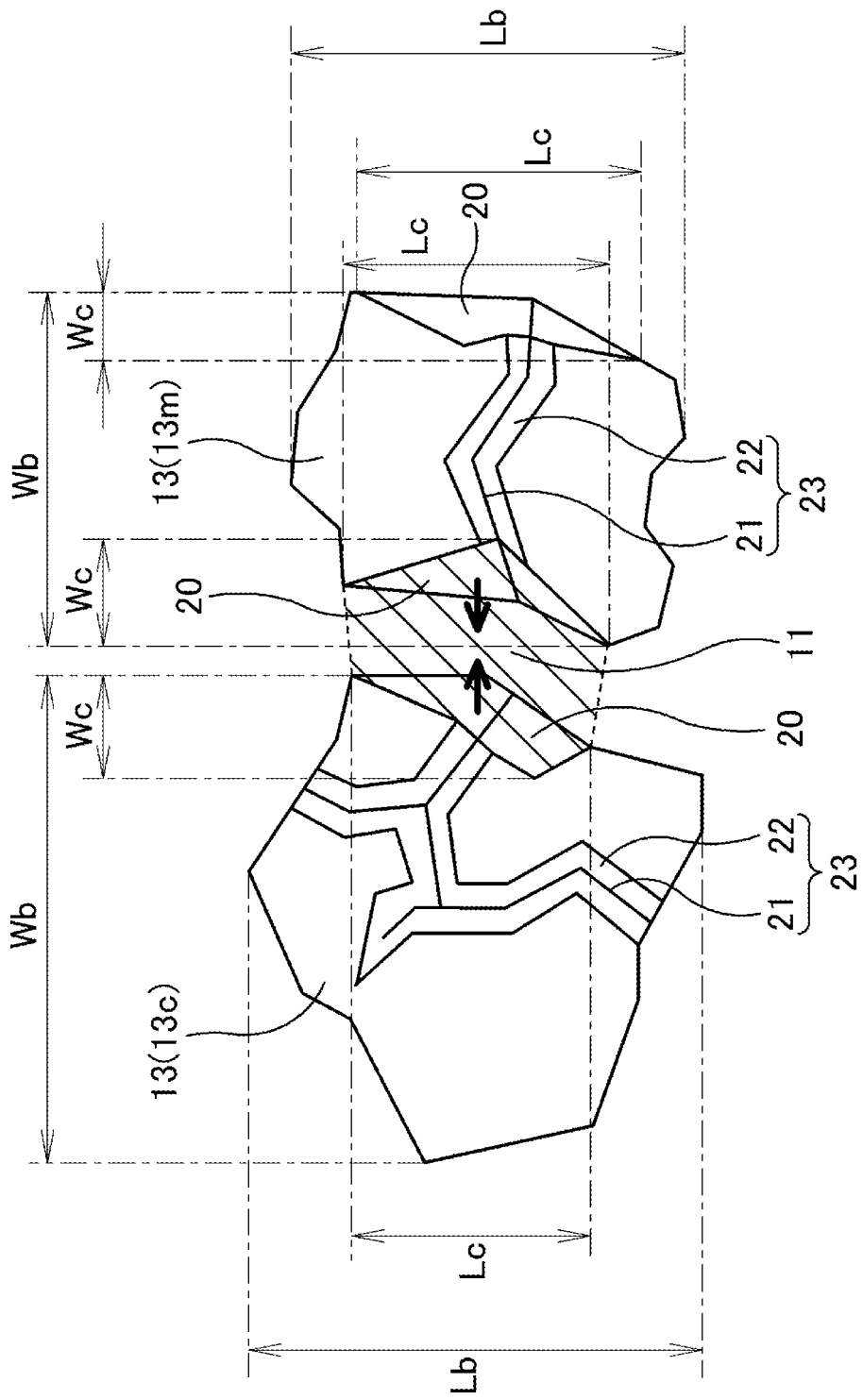
FIG. 3 is an explanatory diagram illustrating a block in FIG. 2 in an enlarged manner.
Figure 4A:
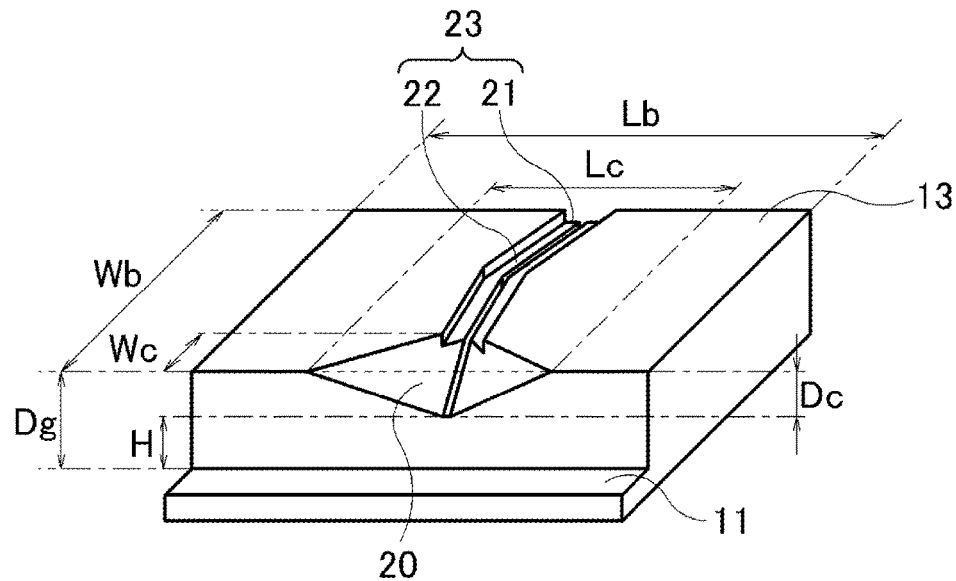
FIG. 4 is an explanatory diagram schematically illustrating a shape of a notch portion in the present technology.

In the present technology, as illustrated in FIG. 3 in an enlarged manner, the notch portion 20 is formed at a portion of each of the freely-selected pair of blocks 13 adjacent to each other across the longitudinal groove 11, the portion facing the longitudinal groove 11. In FIG. 3, the center block 13c and the middle block 13m adjacent to each other across the longitudinal groove 11 are exemplified. However, the same holds true to the other blocks. As illustrated in FIG. 4, the notch portion 20 is a portion recessed inward of the block 13 in the following manner. That is, as viewed from the side surface side of the block 13, the block is cut in a V-shape or a trapezoidal shape opening to a side (a contour line) corresponding to the road contact surface of the block 13. Further, as viewed from the road contact surface side of the block 13, the block is cut in a V-shape or a trapezoidal shape opening to a side (contour line) corresponding to the side surface of the block 13. The notch portions 20 formed in the pair of blocks 13 face with each other across the longitudinal groove 11. A notch width Wc and a notch depth Dc of each of the notch portions 20 are larger on a center side in an extension direction of the longitudinal groove than on an outer side in the extension direction of the longitudinal groove. Note that the notch width Wc is a distance of the notch portion 20 in the tire lateral direction between the outermost point in the tire lateral direction and the innermost point in the tire lateral direction on the road contact surface of the block 13. The notch depth Dc is a distance between the road contact surface of the block 13 and the deepest point of the notch portion 20 on the side surface of the block 13.

The pair of notch portions 20 facing with each other across the longitudinal groove 11 are formed in the pair of blocks 13 adjacent to each other in the tire lateral direction as described above. Thus, when the pair of blocks 13 are deformed toward the longitudinal groove 11 side (the arrow directions in FIG. 3) during traveling, mud or the like in an area surrounded by the pair of notch portions 20 (the hatched portion in FIG. 3) is compressed, and a high shear force due to a soil column formed by compressed mud or the like can be obtained. As a result, driving performance on unpaved roads (for example, mud performance) can be enhanced effectively. Particularly, the notch portion 20 in the present technology has the above-mentioned structure, and hence a plurality of flat surfaces facing the longitudinal groove 11 are formed. Those flat surfaces are oriented toward the center direction of the area (the hatched portion in FIG. 3) surrounded by the pair of notch portions 20, and hence mud or the like can be compressed efficiently. Further, the notch width Wc and the notch depth Dc are larger on the center side in the extension direction of the longitudinal groove 11 than on the outer side in the extension direction of the longitudinal groove 11. Thus, even when the notch portion 20 is provided, wear resistance can be maintained satisfactorily.

In this case, when the notch portion 20 is provided in only one of the pair of blocks 13, the notch portions 20 do not face with each other, or the notch portion 20 does not have the above-mentioned shape, the notch portion 20 cannot compress mud or the like sufficiently. As a result, an effect of enhancing driving performance on unpaved roads is limited.

In addition to the above-mentioned notch portion 20, each of the blocks 13 may be provided with a sipe 21 that extends in the tire lateral direction and communicates with the notch portion 20. Alternatively, there may be provided a combined groove 23 formed of a shallow groove 22 that extends in the tire lateral direction and communicates with the notch portion 20 and a sipe that is formed in a groove bottom of the shallow groove 22, extends along the shallow groove 22, and communicates with the notch portion 20. Note that, in the present technology, "sipe" is a fine groove with a groove width of 1.5 mm or less, and "shallow groove" is a groove with a groove depth of 2 mm or less. Any of FIG. 2 to FIG. 4 illustrates a mode in which the combined groove 23 is provided. In other words, when elements (a groove and a sipe) other than the above-mentioned notch portion 20 are provided in each of the blocks 13, preferably, a groove that does not satisfy the above-mentioned dimension (a groove with a groove width exceeding 1.5 mm or a groove depth exceeding 2 mm) does not communicate with the notch portion 20. Preferably, only the sipe 21, or only the sipe 21 and the shallow groove 22 (only the combined groove 23) communicate with the notch portion 20. With the formation of the sipe 21 or the shallow groove 22 as described above, an edge effect due to the sipe 21 or the shallow groove 22 can be imparted, which is advantageous in enhancing driving performance on unpaved roads. Meanwhile, the element communicating with the notch portion 20 is the sipe 21 with a sufficiently small groove width or the shallow groove 22 with a sufficiently small groove depth, and hence wear resistance can be maintained satisfactorily. When a groove that does not satisfy the above-mentioned dimension is provided, the block 13 is substantially subdivided, which makes it difficult to obtain an effect of compressing mud or the like with the notch portion 20. The depth of the sipe 21 is not particularly limited, and may have a groove depth falling within a range of from 30% to 100% of the depth of the longitudinal groove 11, for example. Further, the width of the shallow groove 22 is not particularly limited, and may be set to fall within a range of from 4 mm to 8 mm, for example.

Figure 4B:
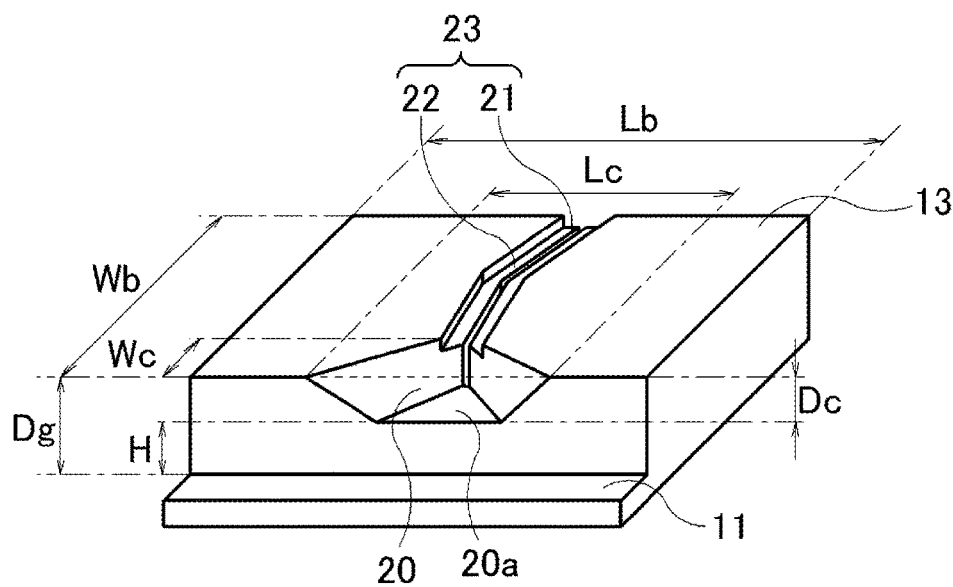

As described above, the notch portion 20 in the present technology compresses mud or the like. In order to compress mud or the like more efficiently, a bottom portion 20a formed of a surface parallel with the road contact surface of the block 13 may be provided as illustrated in FIG. 4B. By providing the bottom portion 20a as described above, when the block 13 having the notch portion 20 is brought into contact with a ground, a force can be transmitted by the bottom portion 20a in a vertical direction, mud or the like can be compressed efficiently, and a shear force can further be enhanced. Thus, this is advantageous in enhancing driving performance on unpaved roads.

In any of the cases described above, the notch width Wc of the notch portion 20 preferably falls within a range from 10% to 25% of a tire lateral direction length Wb of the block. By setting the notch width Wc as described above, the size of the notch portion 20 is optimized, which is advantageous in achieving driving performance on unpaved roads (for example, mud performance) and wear resistance in a well-balanced, compatible manner. When the notch width Wc is smaller than 10% of the tire lateral direction length Wb of the block, the notch portion 20 is excessively small, and hence an effect of enhancing driving performance on unpaved roads (for example, mud performance) is limited. When the notch width Wc is larger than 25% of the tire lateral direction length Wb of the block, the notch portion 20 is excessively large, and hence block rigidity is degraded, which makes it difficult to maintain wear resistance.

Further, a portion of the notch portion 20, which has the largest notch depth Dc, is preferably positioned at 35% or greater, more preferably, a range from 36% to 53% of a maximum groove depth Dg of the longitudinal groove 11 from the groove bottom of the longitudinal groove 11. In other words, assuming that a height H is a distance from the groove bottom of the longitudinal groove 11 to the portion with the largest notch depth Dc, a ratio of the height H with respect to the maximum groove depth Dg of the longitudinal groove 11 is preferably 35% or greater, more preferably, falls within a range from 36% to 53%. With this, the notch depth Dc can be optimized, which is advantageous in achieving driving performance on unpaved roads (for example, mud performance) and wear resistance in a well-balanced, compatible manner. Note that, when the bottom portion 20a is present in the notch portion 20, the portion with the largest notch depth Dc corresponds to the bottom portion 20a. When the position of the portion with the largest notch depth Dc is present on the groove bottom side with respect to 35% of the maximum groove depth Dg of the longitudinal groove 11, the notch portion 20 is excessively large, and block rigidity is degraded, which makes it difficult to maintain wear resistance.

Moreover, the notch length Lc of the notch portion 20 preferably falls within a range from 40% to 75% of a tire circumferential direction length Lb of the block 13 provided with the notch portion 20. By setting the notch length Lc as described above, the size of the notch portion 20 is optimized, which is advantageous in achieving driving performance on unpaved roads (for example, mud performance) and wear resistance in a well-balanced, compatible manner. When the notch length Lc is smaller than 40% of the tire circumferential direction length Lb of the block 13, the notch portion 20 is excessively small, and an effect of enhancing driving performance on unpaved roads (for example, mud performance) is limited. When the notch length Lc is larger than 75% of the tire circumferential direction length Lb of the block 13, the notch portion 20 is excessively large, and block rigidity is degraded, which makes it difficult to maintain wear resistance. Note that the notch length Lc is a distance in the tire lateral direction between both end points of the notch portion 20 in the tire circumferential direction on the road contact surface of the block 13.

In the present technology, as described above, the notch portion 20 compresses mud or the like. Thus, when the groove width of the longitudinal groove 11 is extremely large, it is difficult to compress mud or the like effectively. In view of this, the groove width of the longitudinal groove 11 between the notch portions 20 facing with each other is preferably set to fall within a range of from 7 mm to 13 mm. When the groove width of the longitudinal groove 11 is smaller than 7 mm, the groove volume is reduced, which may affect original driving performance. When the groove width of the longitudinal groove 11 is larger than 13 mm, the blocks 13 are away from each other. Thus, an effect of enhancing a shear force, which is exerted by the notch portion 20 compressing mud or the like, is limited. Note that the groove width of the longitudinal groove 11 is a distance along the tire lateral direction between a freely-selected point on one groove wall of the longitudinal groove 11 and an intersection point between the other groove wall and a straight line drawn from the freely-selected point along the tire lateral direction on the road contact surface of the block 13.

Figure 5A:
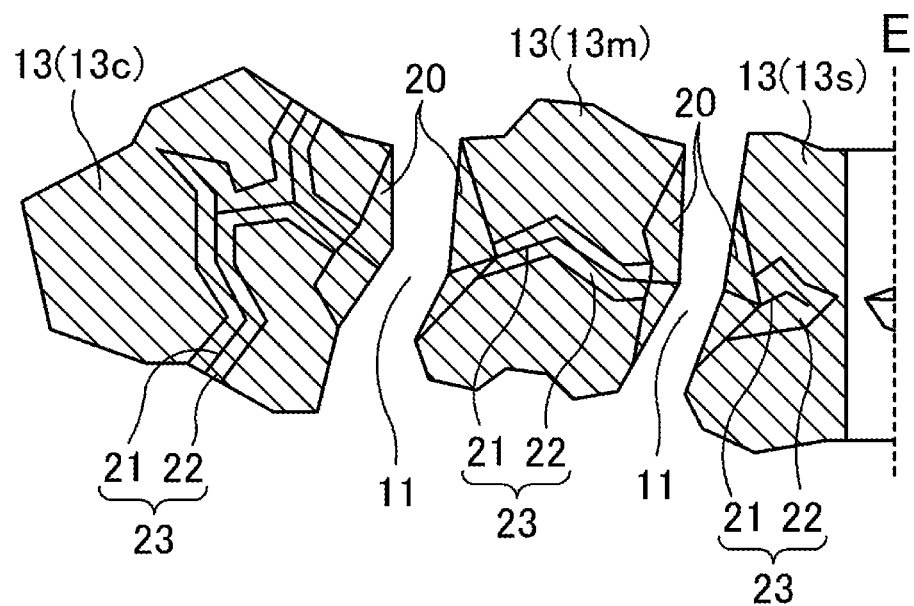
FIG. 5 is an explanatory diagram illustrating an area of the notch portion in the present technology.
Figure 5B:
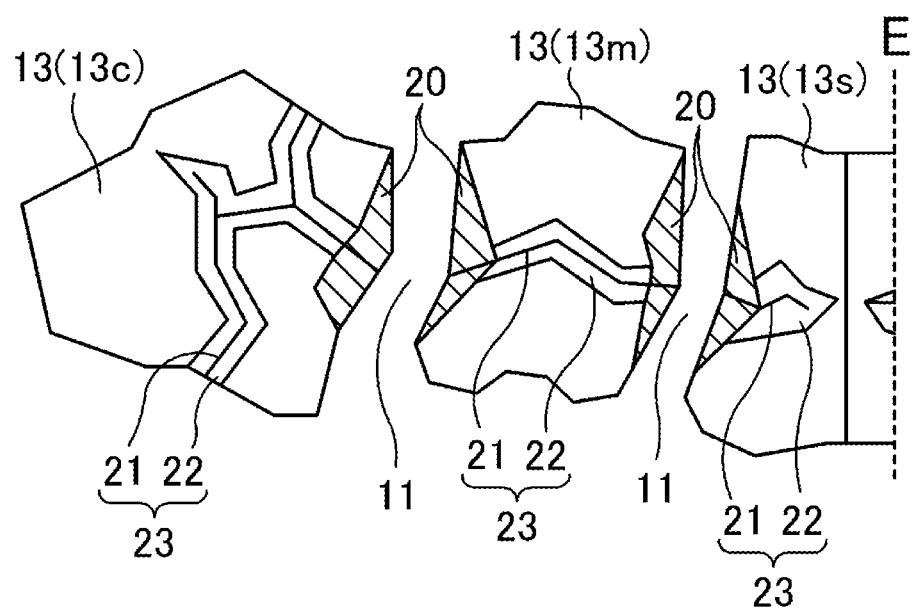

Further, in addition to the above-mentioned dimensions, a ratio of an area of the notch portion 20 on the road contact surface of the block 13 with respect to a projected area of the road contact surface of the block 13 preferably falls within a range from 3% to 16%. By providing the area of the notch portion 20 as described above, the size of the notch portion 20 is optimized, which is advantageous in achieving driving performance on unpaved roads (for example, mud performance) and wear resistance in a well-balanced, compatible manner. When the ratio of the area of the notch portion 20 is less than 3%, the notch portion 20 is excessively small, and an effect of enhancing driving performance on unpaved roads (for example, mud performance) is limited. When the ratio of the area of the notch portion 20 is greater than 16%, the notch portion 20 is excessively large, and block rigidity is degraded, which makes it difficult to maintain wear resistance. Note that, as illustrated in FIG. 5A, the projected area of the road contact surface of the block 13 is an entire area (the hatched portion) including the notch portion 20, the shallow groove, and the sipe when each of the blocks 13 is viewed from the road contact surface side. However, the shoulder block 13s in the illustrated example has an edge portion on an outer side in the tire lateral direction, which is largely chamfered, and the edge portion of the surface that actually contacts the ground is positioned inward in the tire lateral direction with respect to a ground contact edge E. Thus, the portion positioned outward in the tire lateral direction with respect to the edge portion of the surface that actually contacts the ground is excluded from the area. As illustrated in FIG. 5B, the area of the notch portion 20 is an area of the portion of the notch portion 20 (the hatched portion) when the notch portion 20 is viewed from the road contact surface side of the block 13. When the plurality of notch portions 20 are provided in the middle block 13m as in the illustrated example, a ratio of the total area of all the notches included in the block 13 satisfies the above-mentioned range.

EXAMPLES

Twenty-five types of pneumatic tires in Conventional Example 1, Comparative Example 1, and Examples 1 to 23 were produced. Each of the pneumatic tires had a tire size of 35×12.50 R17, had a basic structure exemplified in FIG. 1, and had the tread pattern in FIG. 2 as the basis. Each of the pneumatic tires was produced to satisfy the following conditions as shown in Tables 1 to 3, that is, presence or absence of the notch portion, a position of the notch portion, a shape of the notch portion, a type of an element other than the notch portion, which is provided to each of the blocks, a ratio of the notch width Wc of the notch portion with respect to the tire lateral direction length Wb of the block (Wc/Wb× 100%), a ratio of the height H of the portion with the largest notch depth from the groove bottom of the longitudinal groove with respect to the maximum groove depth Dg of the longitudinal groove (H/Dg×100%), a ratio of the area of the notch portion on the road contact surface of the block with respect to the projected area of the road contact surface of the block, a ratio of the notch length Lc of the notch portion with respect to the tire circumferential direction length Lb of the block (Lc/Lb×100%), and presence or absence of the bottom portion of the notch portion.

Note that Conventional Example 1 is an example without a notch portion, and is a mode in which the notch portion of each of the blocks was removed from the tread pattern in FIG. 2. Comparative Example 1 is an example in which a notch portion is provided only to one of the blocks adjacent to each other across the longitudinal groove, and is a mode in which one of the notch portions facing with each other (the notch portion on the tire equator side) was removed from the tread pattern in FIG. 2.

The row "elements other than the notch portion" in each of Tables 1 to 3 shows a type of an element other than the notch portion, which was provided to each of the blocks. "Sipe" is a fine groove with a groove width of 1.5 mm or less, and "shallow groove" is a groove with a groove depth of 2 mm or less. "Combined groove" is a groove obtained by providing the sipe in the groove bottom of the shallow groove as in the examples in FIG. 2 to FIG. 4. "Groove" is a groove other than "sipe" and "shallow groove" described above, and has a groove width of 2 mm and a groove depth of 3 mm. Further, the row also indicates whether those grooves communicated with the notch portion in parentheses. Specifically, a case where those grooves communicated with the notch portion is indicated as "communicating", and a case where those grooves did not communicate with the notch portion (a case where those grooves ended within the block without arriving at the notch) is indicated as "not communicating".

Mud performance and wear resistance of those pneumatic tires were evaluated by the following evaluation methods. The results are also shown in Tables 1 to 3.

Mud Performance

The test tires were assembled on wheels with a rim size of 17×10.0 J, inflated to an air pressure of 240 kPa, and mounted on a test vehicle (four wheel drive vehicle). A test driver performed sensory evaluation on acceleration performance and escape performance on a mud road surface. Evaluation results are expressed as index values with Conventional Example 1 being assigned the index value of 100. Larger index values indicate superior mud performance. Note that the index value less than "102" is substantially equivalent to the conventional case (the case without a notch portion), and indicates that an effect of enhancing mud performance was not obtained. The index value of "107" or greater indicates particularly excellent mud performance.

Wear Resistance

The test tires were assembled on wheels with a rim size of 17×10.0 J, inflated to an air pressure of 240 kPa, and mounted on a test vehicle (four wheel drive vehicle). After driving on a paved road for 30000 km, the wear amount after the drive was measured. Evaluation results are expressed as index values with a multiplicative inverse of a measurement value of Conventional Example 1 being assigned the index value of 100. Larger index values indicate less wear amounts and superior wear resistance. Note that the index value of "95" or greater indicates that wear resistance at the level in the related art (equivalent to the case without a notch) was maintained. The index value of "97" or greater indicates that particularly satisfactory wear resistance was exerted.

TABLE 1

|  |  | Conventional Example 1 | Comparative Example 1 | Example 1 | Example 2 |
| --- | --- | --- | --- | --- | --- |
| Presence or absence of notch portion |  | No | Yes | Yes | Yes |
| Position of notch portion |  | — | One side | Facing | Facing |
| Type of element other than notch portion |  | Combined groove | Combined groove (Communicating) | Combined groove (Communicating) | Combined groove (Communicating) |
| Wc/Wb × 100 | % | — | 13 | 13 | 13 |
| H/Dg × 100 | % | — | 54 | 54 | 54 |
| Ratio of area | % | — | 12 | 12 | 12 |
| Lc/Lb × 100 | % | — | 60 | 60 | 60 |
| Presence or absence of raised bottom portion |  | — | No | No | Yes |
| Mud performance | Index value | 100 | 101 | 107 | 109 |
| Wear resistance | Index value | 100 | 99 | 98 | 98 |

|  |  | Example 3 | Example 4 | Example 5 | Example 6 |
| --- | --- | --- | --- | --- | --- |
| Presence or absence of notch portion |  | Yes | Yes | Yes | Yes |
| Position of notch portion |  | Facing | Facing | Facing | Facing |
| Type of element other than notch portion |  | Sipe (Communicating) | Shallow groove (Communicating) | Combined groove (Not communicating) | Groove (Communicating) |
| Wc/Wb × 100 | % | 13 | 13 | 13 | 13 |
| H/Dg × 100 | % | 54 | 54 | 54 | 54 |
| Ratio of area | % | 12 | 12 | 12 | 12 |
| Lc/Lb × 100 | % | 60 | 60 | 60 | 60 |
| Presence or absence of raised bottom portion |  | No | No | No | No |
| Mud performance | Index value | 107 | 104 | 105 | 102 |
| Wear resistance | Index value | 99 | 99 | 98 | 95 |

TABLE 2

|  |  | Example 7 | Example 8 | Example 9 | Example 10 |
| --- | --- | --- | --- | --- | --- |
| Presence or absence of notch portion |  | Yes | Yes | Yes | Yes |
| Position of notch portion |  | Facing | Facing | Facing | Facing |
| Type of element other than notch portion |  | Combined groove (Communicating) | Combined groove (Communicating) | Combined groove (Communicating) | Combined groove (Communicating) |
| Wc/Wb × 100 | % | 2 | 10 | 25 | 30 |
| H/Dg × 100 | % | 54 | 54 | 54 | 54 |
| Ratio of area | % | 12 | 12 | 12 | 12 |
| Lc/Lb × 100 | % | 60 | 60 | 60 | 60 |
| Presence or absence of raised bottom portion |  | No | No | No | No |
| Mud performance | Index value | 106 | 107 | 108 | 109 |
| Wear resistance | Index value | 99 | 98 | 97 | 96 |

|  |  | Example 11 | Example 12 | Example 13 | Example 14 |
| --- | --- | --- | --- | --- | --- |
| Presence or absence of notch portion |  | Yes | Yes | Yes | Yes |
| Position of notch portion |  | Facing | Facing | Facing | Facing |
| Type of element other than notch portion |  | Combined groove (Communicating) | Combined groove (Communicating) | Combined groove (Communicating) | Combined groove (Communicating) |
| Wc/Wb × 100 | % | 10 | 10 | 10 | 10 |
| H/Dg × 100 | % | 30 | 35 | 38 | 45 |
| Ratio of area | % | 12 | 12 | 12 | 12 |
| Lc/Lb × 100 | % | 60 | 60 | 60 | 60 |
| Presence or absence of raised bottom portion |  | No | No | No | No |
| Mud performance | Index value | 109 | 108 | 107 | 106 |
| Wear resistance | Index value | 96 | 97 | 98 | 99 |

TABLE 3

|  |  | Example 15 | Example 16 | Example 17 |
| --- | --- | --- | --- | --- |
| Presence or absence of notch portion |  | Yes | Yes | Yes |
| Position of notch portion |  | Facing | Facing | Facing |
| Type of element other than notch portion |  | Combined groove (Communicating) | Combined groove (Communicating) | Combined groove (Communicating) |
| Wc/Wb × 100 | % | 10 | 10 | 10 |
| H/Dg × 100 | % | 54 | 54 | 54 |
| Ratio of area | % | 1 | 3 | 16 |
| Lc/Lb × 100 | % | 60 | 60 | 60 |
| Presence or absence of raised bottom portion |  | No | No | No |
| Mud performance | Index value | 106 | 107 | 108 |
| Wear resistance | Index value | 99 | 98 | 97 |

|  |  | Example 18 | Example 19 | Example 20 |
| --- | --- | --- | --- | --- |
| Presence or absence of notch portion |  | Yes | Yes | Yes |
| Position of notch portion |  | Facing | Facing | Facing |
| Type of element other than notch portion |  | Combined groove (Communicating) | Combined groove (Communicating) | Combined groove (Communicating) |
| Wc/Wb × 100 | % | 10 | 10 | 10 |
| H/Dg × 100 | % | 54 | 54 | 54 |
| Ratio of area | % | 20 | 12 | 12 |
| Lc/Lb × 100 | % | 60 | 30 | 40 |
| Presence or absence of raised bottom portion |  | No | No | No |
| Mud performance | Index value | 109 | 106 | 107 |
| Wear resistance | Index value | 96 | 99 | 98 |

TABLE 3-continued

|  |  | Example 21 | Example 22 | Example 23 |
|---|---|---|---|---|
| Presence or absence of notch portion |  | Yes | Yes | Yes |
| Position of notch portion |  | Facing | Facing | Facing |
| Type of element other than notch portion |  | Combined groove (Communicating) | Combined groove (Communicating) | Combined groove (Communicating) |
| Wc/Wb × 100 | % | 10 | 10 | 10 |
| H/Dg × 100 | % | 54 | 54 | 54 |
| Ratio of area | % | 12 | 12 | 12 |
| Lc/Lb × 100 | % | 50 | 75 | 80 |
| Presence or absence of raised bottom portion |  | No | No | No |
| Mud performance | Index value | 107 | 108 | 109 |
| Wear resistance | Index value | 98 | 97 | 96 |

As can be seen from Table 1, any of Examples 1 to 23 provided enhanced mud performance while maintaining wear resistance as compared to Conventional Example 1. Particularly, Examples 1 to 3, 8 to 9, 12 to 13, 16 to 17, and 20 to 22 provided such performance in a well-balanced manner to a high degree. Note that only the mud performance on muddy road surfaces was evaluated but that, even in a case where the vehicle travels on other unpaved roads (snowy roads, sandy ground, rocky areas, or the like), the tire according to the embodiment of the present technology provides the same functions for snow, sand, stone, rock, or the like on road surfaces as the functions for mud on muddy road surfaces, and thus favorably exhibits superior driving performance on unpaved roads and high damage resistance.

In contrast, in Comparative Example 1, the notch portions did not face with each other, and hence mud and the like could not be compressed sufficiently. Thus, an effect of enhancing mud performance could not be obtained.

The invention claimed is:

1. A pneumatic tire, comprising:
a tread portion extending in a tire circumferential direction and having an annular shape;
a pair of sidewall portions arranged on both sides of the tread portion; and
a pair of bead portions arranged inward of the pair of sidewall portions in a tire radial direction, wherein the tread portion comprises:
a plurality of longitudinal grooves extending in the tire circumferential direction;
a plurality of lateral grooves extending in a tire lateral direction; and
a plurality of blocks defined by the plurality of longitudinal grooves and the plurality of lateral grooves,
notch portions are formed in portions of a freely-selected pair of blocks adjacent to each other across a longitudinal groove, the portions facing the longitudinal groove,
the notch portions face with each other across the longitudinal groove,
the notch portion has a notch width and a notch depth larger on a center side in an extension direction of the longitudinal groove than on an outer side in the extension direction of the longitudinal groove,
each of the plurality of blocks has a combined groove formed of a shallow groove and a sipe, the shallow groove having a groove depth of 2 mm or less and extending in the tire lateral direction, the sipe having a groove width of 1.5 mm or less and formed in a groove bottom of the shallow groove,
only the combined groove communicates with the notch portion, and
the sipe in one of the blocks is a branching sipe having at least three end portions in the one of the blocks, at least one of the three end portions terminates within the one of the blocks and another at least one of the at least three end portions opens to one of the lateral grooves at an edge of the one of the blocks.

2. The pneumatic tire according to claim 1, wherein a portion of the notch portion with the largest notch depth is present at a position of 35% or greater of a maximum groove depth of the longitudinal groove from a groove bottom of the longitudinal groove.

3. The pneumatic tire according to claim 2, wherein a ratio of an area of the notch portion on a road contact surface of each of the plurality of blocks with respect to a projected area of the road contact surface of each of the plurality of blocks falls within a range from 3% to 16%.

4. The pneumatic tire according to claim 3, wherein the notch length of the notch portion falls within a range from 40% to 75% of a tire circumferential direction length of the block provided with the notch portion.

5. The pneumatic tire according to claim 4, wherein the notch portion has a bottom portion formed of a surface parallel with the road contact surface of each of the plurality of blocks.

6. The pneumatic tire according to claim 1, wherein a ratio of an area of the notch portion on a road contact surface of each of the plurality of blocks with respect to a projected area of the road contact surface of each of the plurality of blocks falls within a range from 3% to 16%.

7. The pneumatic tire according to claim 1, wherein the notch length of the notch portion falls within a range from 40% to 75% of a tire circumferential direction length of the block provided with the notch portion.

8. The pneumatic tire according to claim 1, wherein the notch portion has a bottom portion formed of a surface parallel with the road contact surface of each of the plurality of blocks.

9. The pneumatic tire according to claim 1, wherein each of the longitudinal grooves between tread edges of the tread portion are inclined with respect to the tire circumferential direction.

\* \* \* \* \*